United States Patent [19]

Cooper et al.

[11] Patent Number: 4,819,068
[45] Date of Patent: Apr. 4, 1989

[54] TIME DISCRETE DIGITAL REFORMATTOR

[75] Inventors: Alan N. Cooper, Coppell; James K. Taylor, Plano; Erwin E. Cooper, Carrollton, all of Tex.

[73] Assignee: Texas Instruments Incorporated, Dallas, Tex.

[21] Appl. No.: 80,713

[22] Filed: Jul. 31, 1987

[51] Int. Cl.⁴ .............................................. H04N 5/33
[52] U.S. Cl. .................................... 358/113; 358/105; 358/140; 358/166; 358/167
[58] Field of Search ............... 358/113, 166, 167, 105, 358/140

[56] References Cited

U.S. PATENT DOCUMENTS

| | | | |
|---|---|---|---|
| 4,053,946 | 10/1977 | Opittek | 364/200 |
| 4,178,612 | 12/1979 | Dudley | 358/167 |
| 4,301,471 | 11/1981 | Holscher | 385/105 |
| 4,314,275 | 2/1982 | Chapman | 358/113 |
| 4,315,284 | 2/1982 | Stillwell | 358/113 |
| 4,331,874 | 5/1982 | Duncan | 250/347 |
| 4,399,458 | 8/1983 | Berry | 358/113 |
| 4,728,804 | 3/1988 | Norsworthy | 358/113 |
| 4,734,582 | 3/1988 | Gibbons | 358/113 |
| 4,734,583 | 3/1988 | Wang | 358/113 |

FOREIGN PATENT DOCUMENTS 1496697 12/1977 United Kingdom .

Primary Examiner—Howard W. Britton
Attorney, Agent, or Firm—René E. Grossman; James T. Comfort; Melvin Sharp

[57] ABSTRACT

A time discrete digital reformattor reformats analog data from a detector system that includes a plurality of detectors. The time discrete digital reformattor includes a summing circuit, an input circuit in which a single input of the input circuit is connected to a single detector of the detector system, a first time discrete digital memory is electrically connected to receive outputs from the input circuit and a second time discrete digital memory is electrically connected to cooperate with the first time discrete digital memory and the summing circuit.

24 Claims, 9 Drawing Sheets

TIME DISCRETE DIGITAL REFORMATTOR

BACKGROUND OF THE INVENTION

This invention relates to reformattors that are used to reformat video information for processing by an imaging systems such as an infrared imaging system.

Imaging systems which are designed to detect wave lengths normally in the infrared band of frequencies use detector arrays or optical detection systems, which must arrange the processed information in a format compatible with standard video displays.

Previous optical detection systems reformat the image by several techniques, the most common methods are the electro - optical method and the analog conversion method.

The electro - optical method is a multiplexer technique that utilizes multiple parallel channels in which each detector's information is amplified to drive a corresponding Light Emitting Diode, LED. The image recreated by the LED's is then viewed by a visible or near visible wave length camera which presents the information in standard format to be used on a raster scan type monitor. The disadvantage of this type of system is the complexity of the system caused by the multiple parallel channels and therefore the large number of components and the degradation of the signal due to the multiple interfaces through which it must pass.

The analog convesion method converts an amplified analog image from the detectors to time and amplitude discrete digital information where it is stored in a standard memory. It is then multiplexed out of the memory and returned to analog form by an analog to digital conversion. The multiplexer technique is able to arrange the time and amplitude discrete digital information in an arrangement such that when converted back to an analog signal, it is acceptable to a raster scan type display.

SUMMARY OF THE INVENTION

A time discrete digital reformattor reformats analog data from a detector system that includes a plurality of detectors. The time discrete digital reformattor includes a summing circuit, an input circuit in which a single input of the input circuit is connected to a single detector of the detector system, a first time discrete digital memory is electrically connected to receive outputs from the input circuit and a second time discrete digital memory is electrically connected to cooperate with the first time discrete digital memory and the summing circuit.

In one embodiment, there is a first time discrete digital memory and a second time discrete digital memory, both of which are series connected charge coupled devices, CCD, shift registers. The transferring of an analog signal into a CCD shift register performs time discrete digital conversion on the analog signals while maintaining the intergrity of the amplitude information.

In an alternate embodiment which provides an enhance mode similar to the embodiment discussed above, the detector system is an array arranged to have twice the number of detectors and the output of each pair of detectors is combined by a time delay and integration circuit to enhance the image that is presented as a display by the raster scan monitor.

A third embodiment of the invention is provided in which for each detector there is a double pole, double throw switch connected to the first time discrete memory and the second time discrete digital memory. The double pole double throw switch allows one of the two time discrete digital memories to perform the analog to time discrete digital conversion and to store the image data of a field, while the other time discrete digital memory unloads and reformates the video information for display on the raster scan display.

A fourth embodiment of the invention is provided in which a two dimension detector array is used and for each detector, there are two time discrete digital memories with a double pole, double throw switch connected to load one time discrete digital memory while the second time discrete digital memory is being unloaded.

A fifth embodiment uses a CCD array memory that is loaded via a serial in and parallel out CCD shift register and unloaded by a parallel in serial out CCD shift register. A multiplexer multiplexes the inputs from the detectors to the serial in shift registers and thus a display is achievable from the reformatted time discrete digital data.

It is an object of this invention to provide a reformattor that is inexpensive to build, accurate and relatively simple. These and other advantages and objects of the invention will be apparent from the specificiation in conjunction with the figures n which:

BRIEF DESCRIPTION OF THE FIGURES

FIG. 5A illustrates a double pole double throw switch used in the reformatter shown in FIG. 5.

DETAILED DESCRIPTION OF THE PREFERRED EMBODIMENTS

Figure 1:
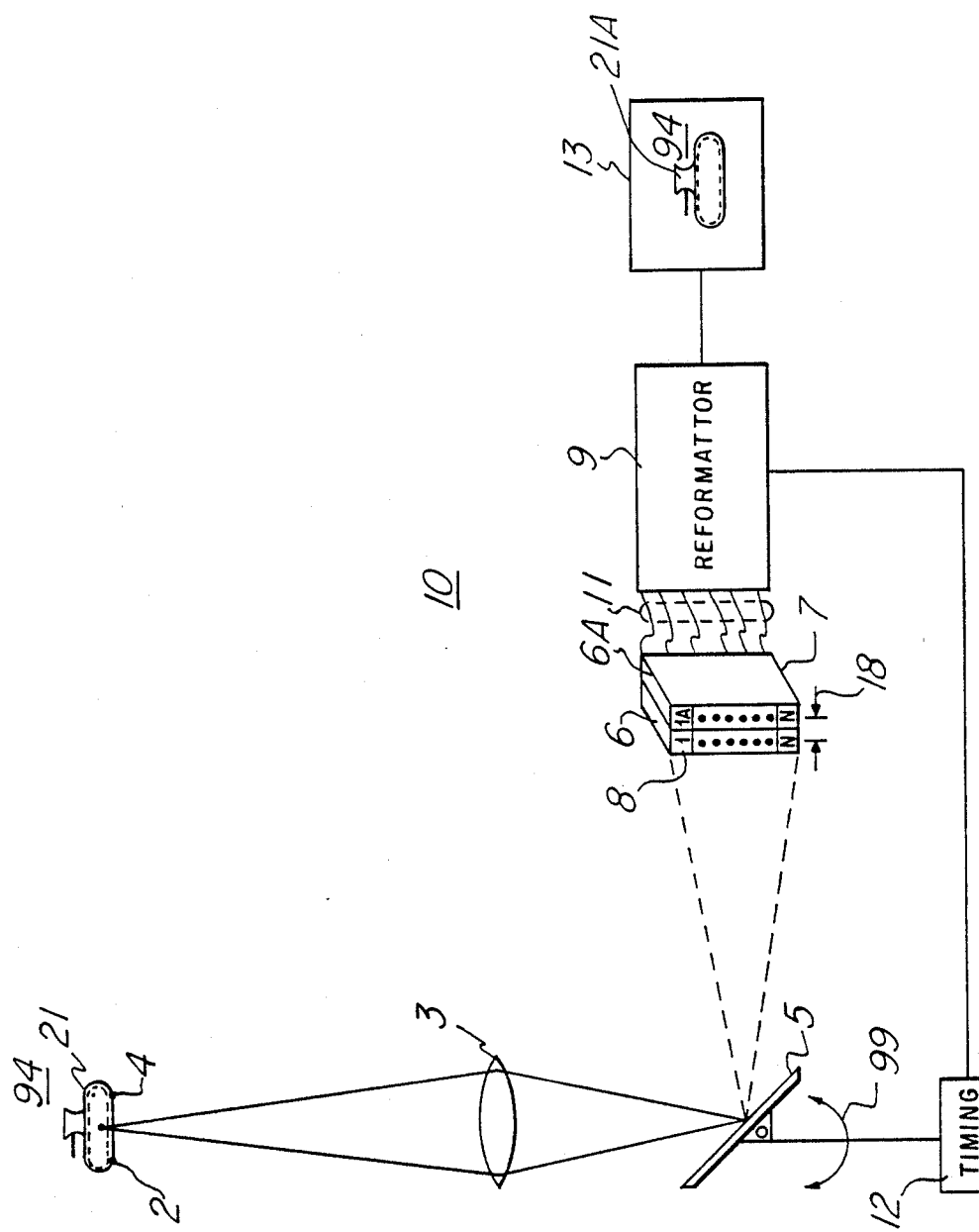
FIG. 1 is a diagram of an imaging system incorporating a reformattor according to the invention.

FIG. 1 to which reference should now be made is a block diagram of an imaging system according to the invention. A scene 94 represented by a tank 21 emits radiation that is focused by a lens 3 and reflected by a scan mirror onto a detector array 7. The detector array converts the light that strikes the array into electrical signals which are applied to a reformattor 9 via conductor bundle 11. The output of the reformattor 9 is applied to a raster scan monitor 13 in which the scene 94 of the tank 21a is displayed. The scan mirror 5 as it moves across the tank from point 2 to point 4 also reflects a focused column of radiation onto the detector array 7. The detector array 7 may include in one embodiment a single column 6 of plurality of detectors (such as 240 individual detectors) or columns 6 and 6a and rows 8 to form a 2 by 240 array. The number of detectors per column may be fewer if multiple scan mirrors are used or if the scan mirror's elevation can be varied.

Figure 2:
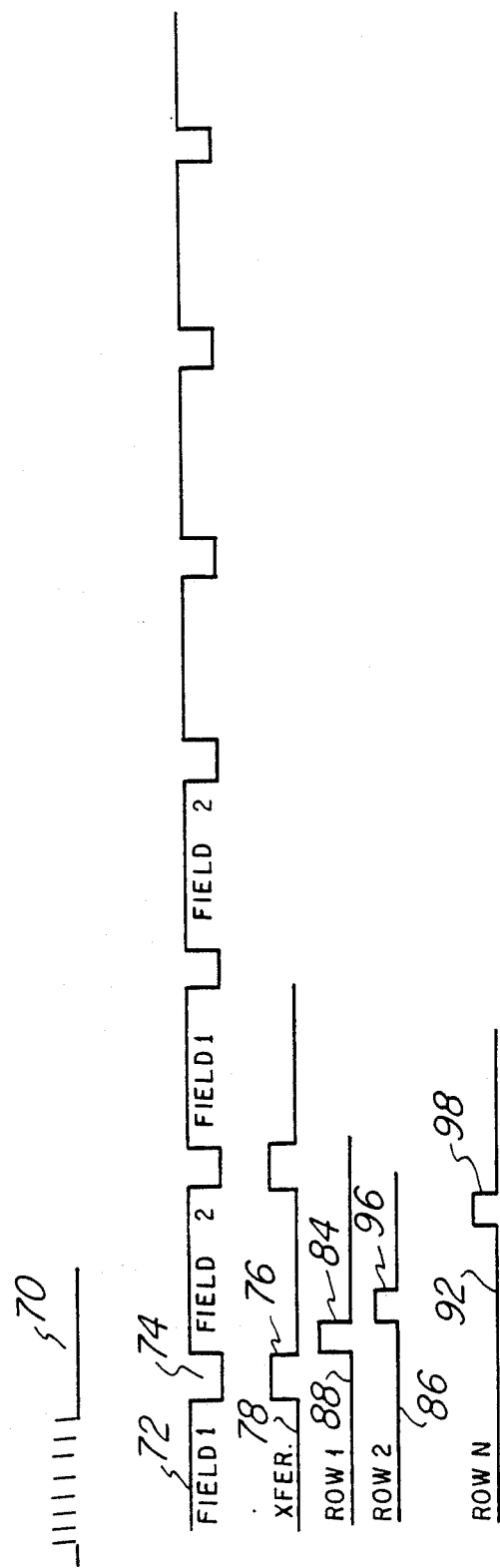
FIG. 2 is the timing waveforms diagram illustrating a timing for reformatting of the image data to video information.
Figure 3:
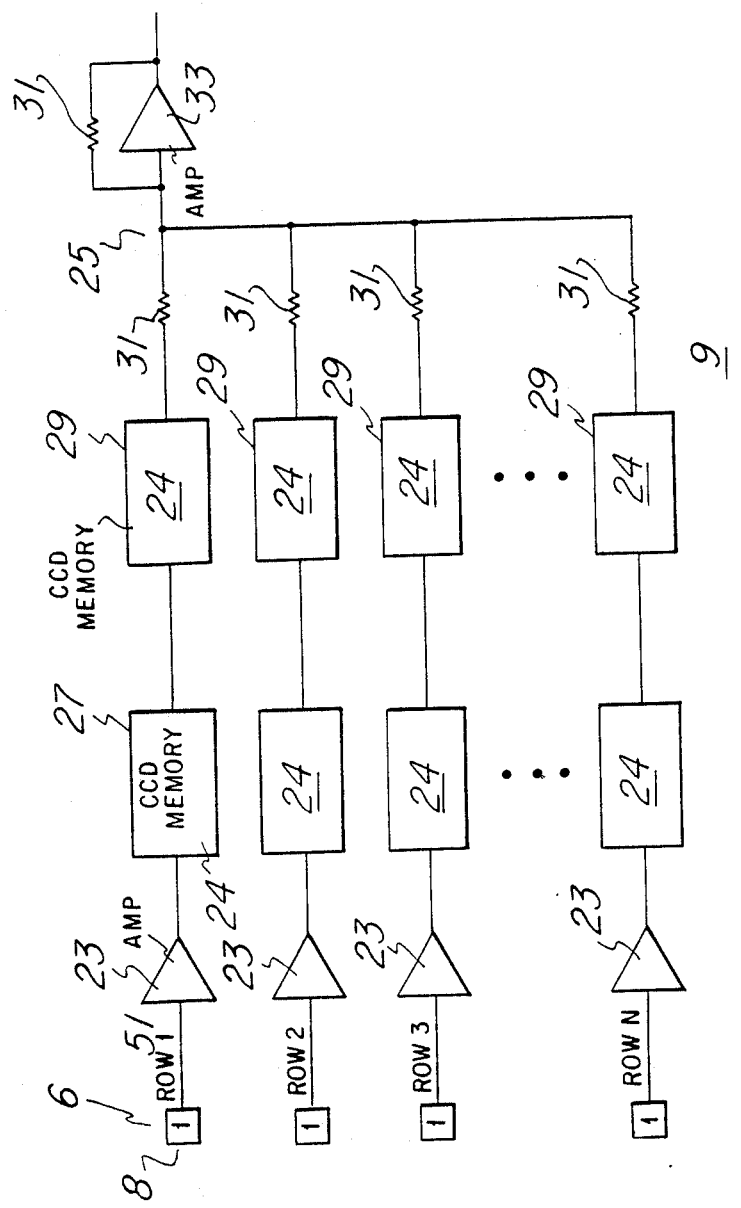
FIG. 3 is a schematic diagram of the reformattor of FIG. 1.

FIG. 3 is a schematic diagram of the reformattor 9 in which each detector 1 is connected to an amplifier 23. As the scan mirror 5 moves across the scene, it focuses the reflected images onto the column 6 of detectors 1. The detectors receive the reflected energy and convert the radiation into electricl signals for amplification by an amplifier 23. The amplifier 23 applies the amplified signal to a first time discrete digital memory 27. The first time discrete memory 27 is a charge coupled device, CCD memory 24, which converts the analog signal from the amplifier 23 into a time discrete digital signal and stores that information in the memory 27. The CCD memory 24 has the number of storage cells that correspond to the number of instantaneous field of view or samples used which in the embodiment shown is 600. Therefore, timing from a timing circuit 12 of FIG. 1 is shown in FIG. 2 and is applied to the first time discrete digital memory 27, as well as to a second time discrete digital memory 29. The second time discrete digital memory 29 is connected in a series arrangement with the first discrete digital memory 27 and is also a CCD memory 24, each of which has a number of cells that correspond to an instantaneous field of view used to form the display of the scene 94 (FIG. 1). This circuit is repeated N times where N is the number of detectors in a column 6 of the detector array 7. The output of each of the CCD memories 29 is applied to a summing circuit 25 which includes an amplifier 33 and a plurality of resistors 31 arranged in a summing circuit configuration.

The scan mirror 5 sweeps across the scene 94 two times per frame as is designated as field 1 and field 2 in waveform 72 of FIG. 2. During the retrace period 74 the time discrete digital data is transferred from the first time discrete digital memory 27 to the second time discrete digital memory 29 for each row. At the start of the second field the first row is applied to the summing circuit 25 as is shown by waveform 80 at pulse 84 which is the first trace of the display of the scene 94. Waveform 86 illustrates the transfer of the time discrete digital data from the second time discrete memory 29 to the summing circuit 25 for the second row. This process is repeated until the final row N is transferred just prior to the completion of the field 2 scan as is illustrated by waveform 92 at pulse 98.

Figure 4:
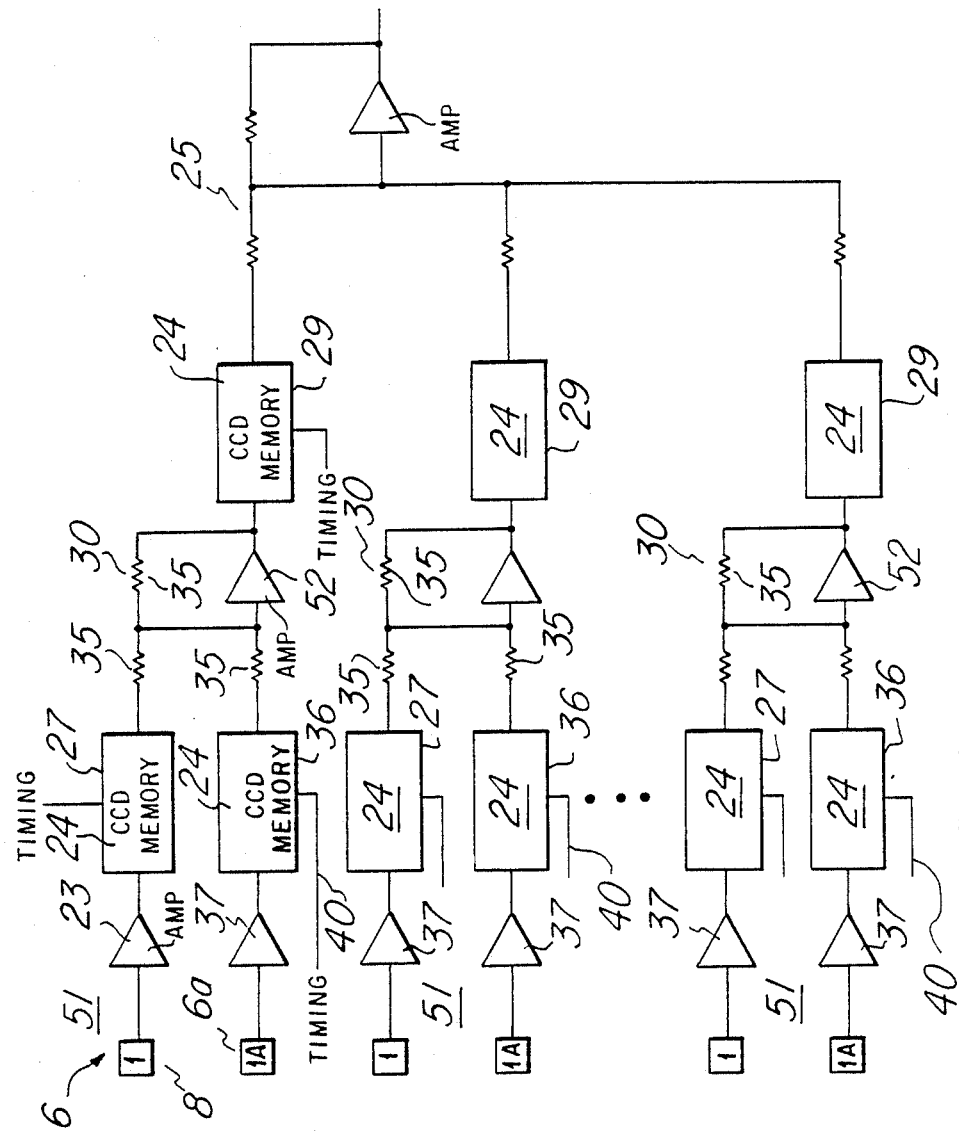
FIG. 4 is a schematic diagram of a time delay and integration reformattor that can be used in the embodiment of FIG. 1.

In FIG. 4, to which reference should now be made, there is shown a time delay and integrate circuit. Each trace of the display is driven by two detectors 1 and 1A, therefore, each row in addition to an amplifier 23, a first time discrete digital memory 27, which is arranged as a time discrete shift register and a second time digital discrete memory 29, which is also arranged as a time discrete shift register, there is a two dimension configuration, as is shown in FIG. 1 by columns 6 and 6a. Therefore, the detectors 1A in column 6A for each row 8 are connected to an amplifier 37, a third time discrete digital memory 36 which is the CCD memory 24 arranged as a shift register. Timing from a timing circuit 12 in addition to being applied to the first time discrete memory 27 and the second time discrete memory 29 is also applied to the third time discrete memory 36 via timing line 40 which provides an additional timing signal that is applied to the CCD memories that corresponds to the phase error between the stored data in the first and third time discrete digital memories that results from the amount of time it takes the scan mirror 5 to travel the distance illustrated by dimension line 18 (FIG. 1). The outputs of the first time discrete memory 27 and the third time discrete memory 36 are summed by a summing circuit 30 that includes a plurality of resistors 35 and an amplifier 52 arranged in an averaging circuit configuration, the output of which is applied to the second time discrete memory 29. The outputs of each channel 51 is summed by the summing circuit 25 for application (in FIG. 1) to the raster scan monitor 13 and thus providing an enhanced image of the scene 21 using the timing arrangement of FIG. 2.

Figure 5:
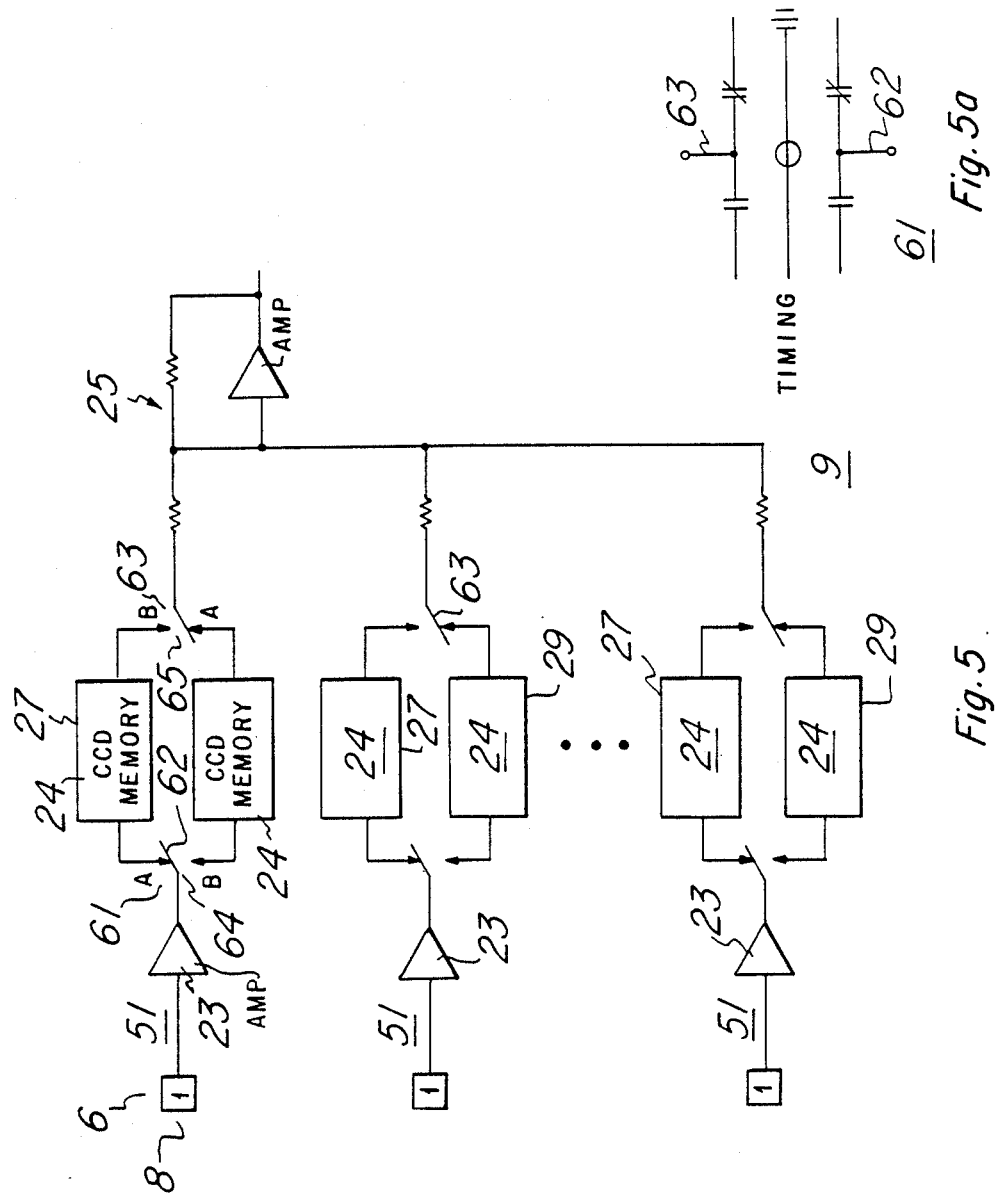
FIG. 5 is an alternate embodiment of the reformattor of FIG. 1.

In FIG. 5, to which reference should now be made, each row 8 of detectors is connected to reformattor channel 51 that includes the input amplifier 23. The output of the input amplifier 23 is connected to a switching arrangement such a double pole double throw switch 61 that includes a first pole 62 and a second pole 63. Each pole 62 and 63 has two sets of contacts, an A and B contact. The output of the amplifier 23 is connected to the pole 62 and the input of the summing circuit 25 is connected to the pole 63. In the embodiment illustrated, during the period of time that the first time discrete digital memory 27 is loaded with data from the amplifier 23, the time discrete digital data within the second time discrete memory 29 is being applied to the summing circuit 25. When the scan mirror 5 (FIG. 1) reaches the end of its trace and returns to the start position, point 2 in FIG. 1, at the transfer pulse 76 (FIG. 2), the switch 61 changes position such that the output of the amplifier 23 is converted to time discrete digital data by the CCD memory 29 due to the fact that the first contact 62 is connected to the B contact as illustrated by dotted line 64 and consequently the time discrete data within the time discrete memory 27 is applied to the summing circuit 25 due to the fact that the pole 63 is connected to the B contact as is illustrated by dotted line 65. Thus, the reformattor 9 illustrated in FIG. 5 reformats the data from the detector array 7 into data that is acceptable by the raster scan monitor 37 (FIG. 1). It is pointed out that double pole double throw switch 61 in the preferred embodiment is implemented by an analog switch as is illustrated in FIG. 5a. The output of the timing circuit 12 (FIG. 1) causes the controls of the analog switch 61 to toggle and thus achieve the circuit arrangement illustrated in FIG. 5.

Figure 6:
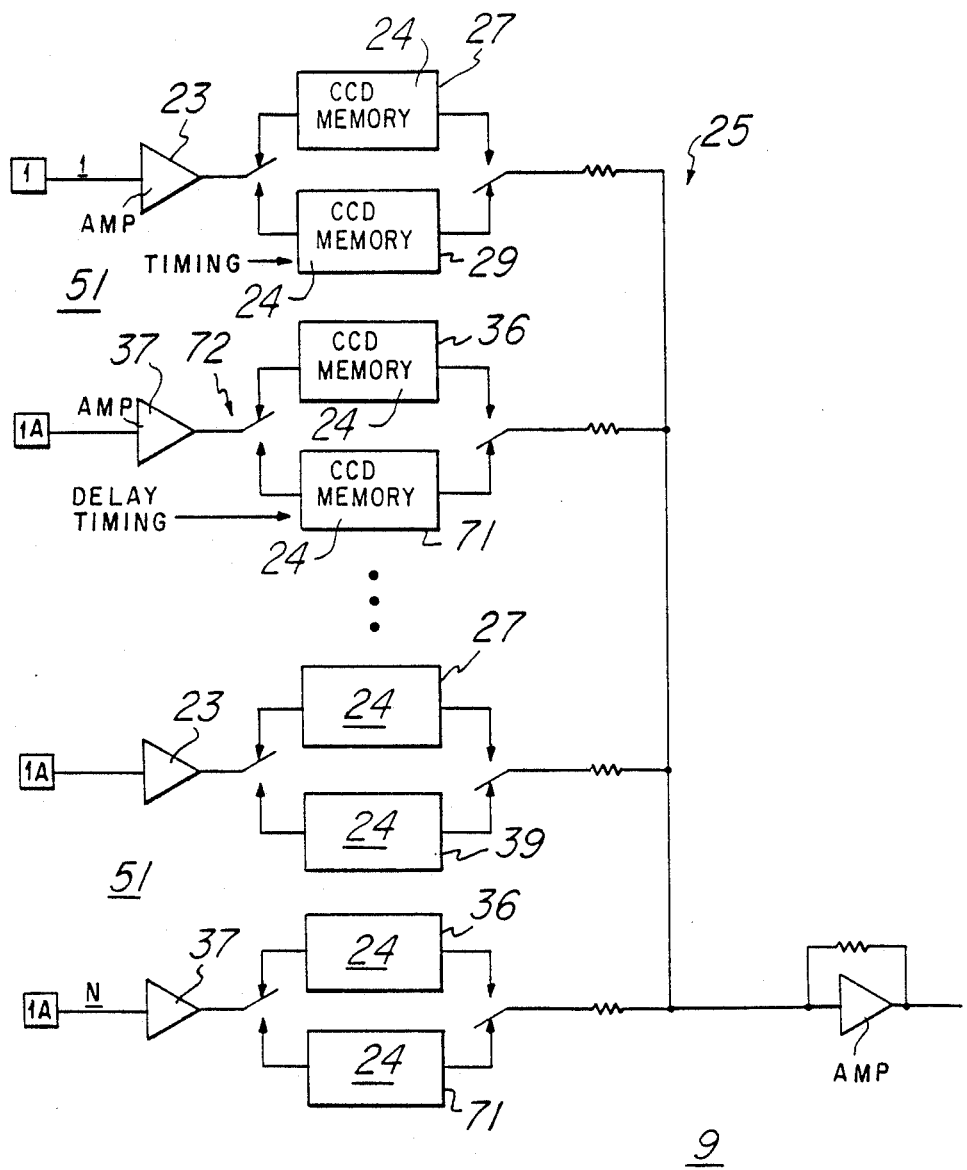
FIG. 6 is an alternate embodiment of the reformattor of FIG. 1.

FIG. 6 is similar to the embodiment shown in FIG. 5, only each row 8 of the detector array 7 has the alternate column 6A of detectors 1A. Therefore, the time delay and integrate function is implemented by the circuit that includes the amplifier 37, the third time discrete digital memory 36 and a fourth time discrete digital memory 71 which are CCD memories 24 that operate as serial in and serial out shift registers. The outputs are time shifted as in the case of FIG. 4 to correct for the separation of the column 6 and 6a. The third and fourth time discrete digital memories 36 and 71 are used to time discrete convert the output of the amplifier 37 and store the discrete converted signal in the third and fourth time discrete memories 36 and 71. The memory being loaded and unloaded is dependent on the position of the double pole, double throw switch 72. Data is time discrete converted and applied to the summing circuit 25 by the circuit arrangement that includes the double pole, double throw switch 72, the third time discrete memory 36 and the fourth time discrete memory 71 in the same manner as was discussed in conjunction with figure 5. The summing circuit 25 performs both the functions of summing circuits 25 and 30 of FIG. 4. Additionally, using the circuit arrangements of FIGS. 5 and 6 eliminates the high speed transfer between memories during the retrace periods 76 as is required in the embodiments of FIGS. 3 and 4.

Figure 7:
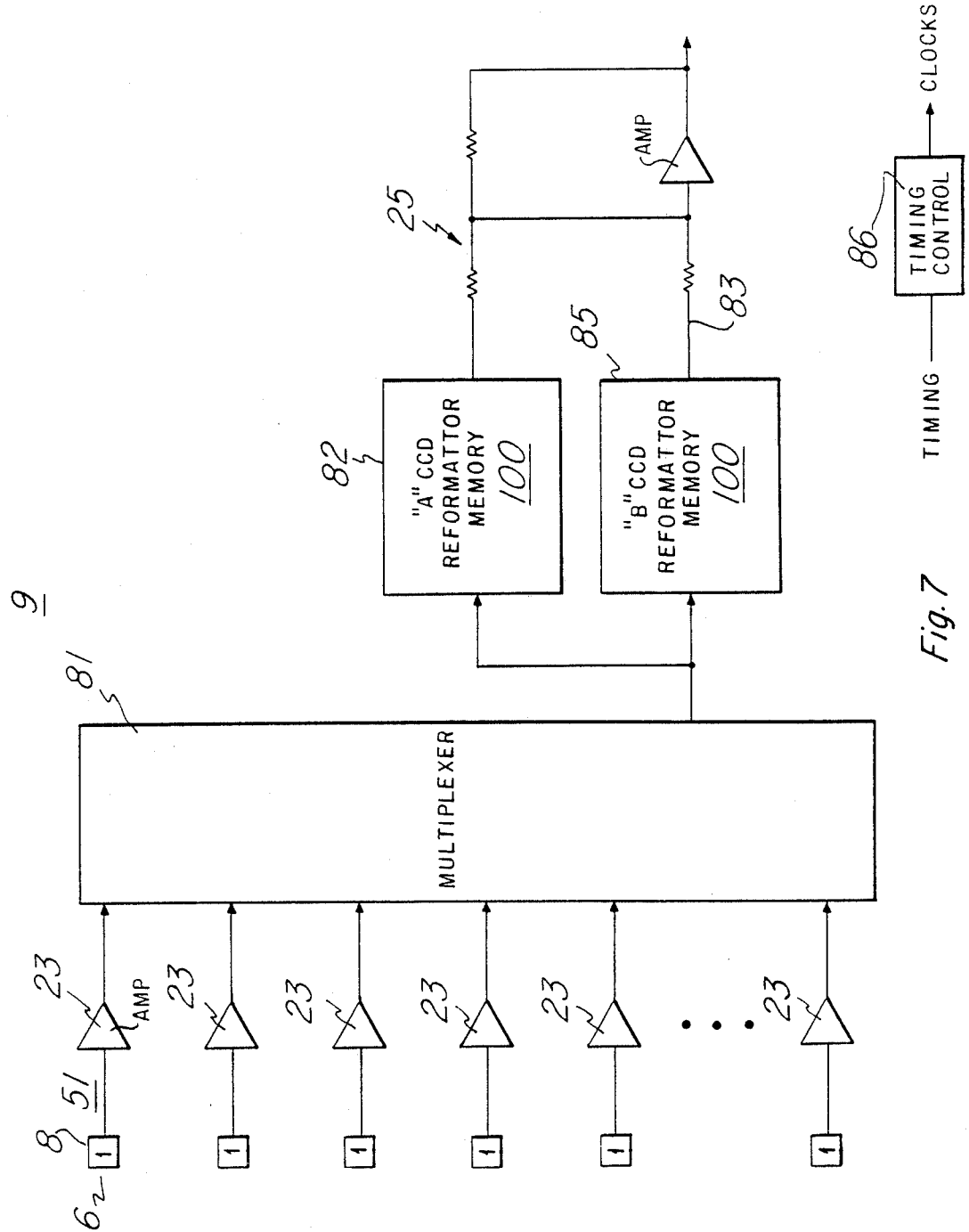
FIG. 7 is a schematic diagram of yet another embodiment of the reformattor of FIG. 1.
Figure 8:
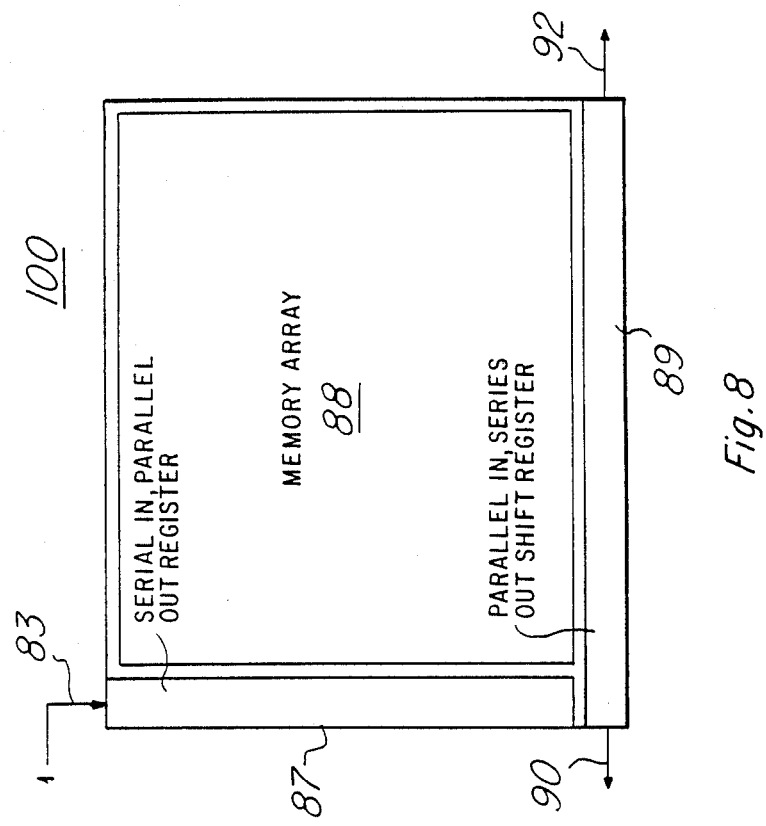
FIG. 8 is a layout of the charge coupled device memory and shift registers of FIG. 7.
Figure 9:
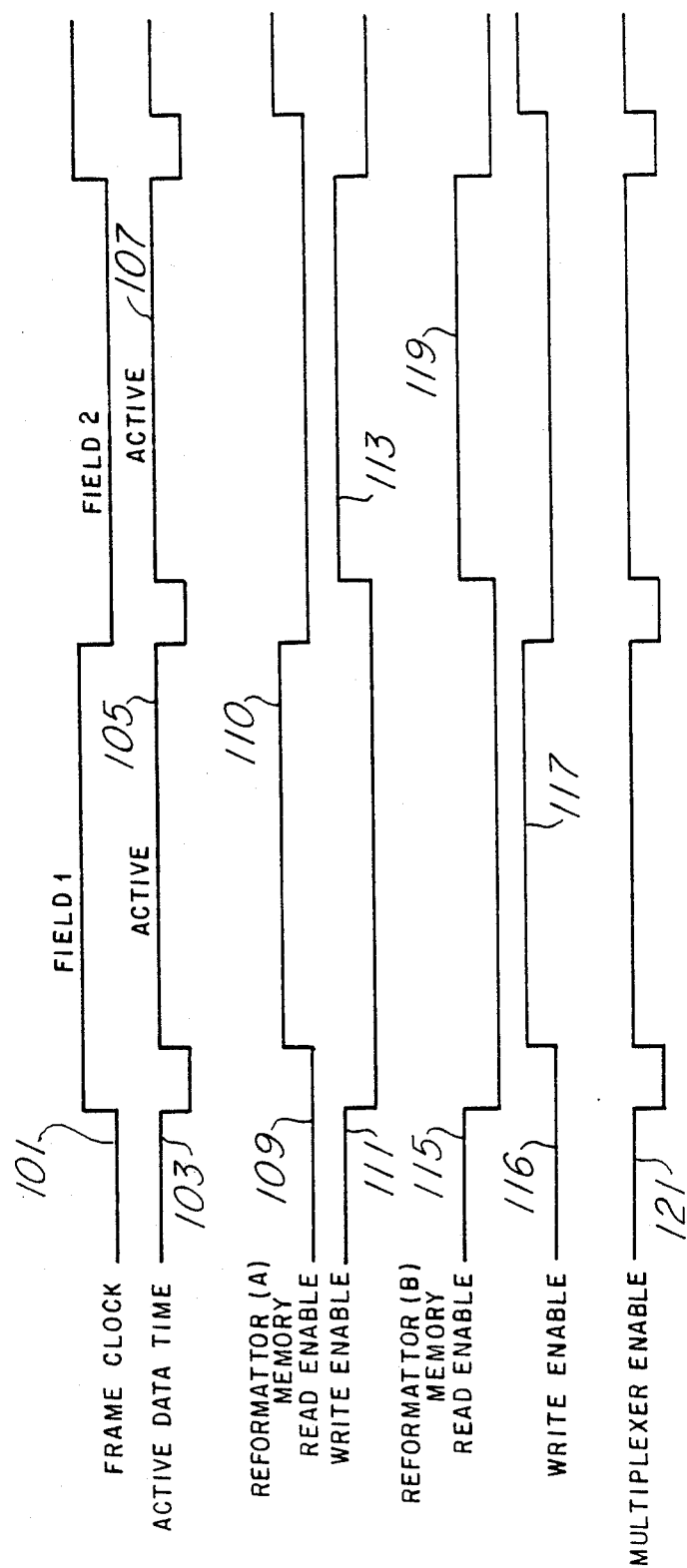
FIG. 9 is a timing diagram of the operation of the reformattor of FIG. 7.

FIGS. 7, 8 and 9 should be discussed concurrently in which FIG. 7 is a schematic diagram of yet another embodiment of the invention. An analog multiplexer 81 is connected to the outputs of the amplifiers 23 of each channel 51. The multiplexer sequentially applies the outputs from each column to an A CCD reformattor memory 82 and to a B CCD reformattor memory 85. The outputs of the A CCD reformattor memory 82 and the B CCD memory 85 are applied to a summing circuit 25 which then drives the raster scan monitor 13 illustrated in FIG. 1. Timing from the timing circuit 12 of FIG. 1 is via timing and control circuit 86 which controls the loading and unloading of the A CCD reformattor memory 82 and the B CCD reformattor memory 85.

Referring to FIG. 8, conductor 83 applies the output of the multiplexer to a serial in parallel out shift register 87 which in the embodiment of FIG. 8 is a CCD shift register and the parallel outputs from the CCD shift register under the control of the timing and control circuit 86 (FIG. 7) is then stored within a memory array 88 which is also a CCD memory. The outputs that are applied to the summing circuit 25 are obtained through the CCD shift register 89 which is a parallel in and series out shift register and in the direction 92 enables the memory 88 to be a first in, first out memory and in the direction indicated by arrow 90 enables the CCD memory 100 be a last in, first out memory.

In FIG. 9, the timing that is provided by the timing and control circuit 86 is illustrated in which a waveform 101 for each frame of data the frame clock provides for a field 1 and a field 2 where a field represents one sweep across the scene 21 by the scan mirror 5 (FIG. 1). There is an active data time that is illustrated by waveform 103 in which after some delay for the retrace of the scan mirror 5, the data from the detector array 7 is active. This is illustrated at points 105 and 107. The read enable for the A CCD reformattor memory 82 is provided by waveform 109 and corresponds to the first active time 105 as is illustrated at 110. The write enable is represented by waveform 111 and corresponds to the active time 107 and is represented as being active at point 113. The B CCD reformattor memory read and write enables are represented by waveforms 115 and 116 and the write enable for the B reformattor memory corresponds to the portion 105 of waveform 103 and is indicated at point 117 of waveform 116 whereas the read enable corresponds to the data active time as represented by portion 107 of waveform 103 and corresponds to the portion 119 of waveform 115. Thus, while the A CCD reformattor memory is being loaded with a complete frame of data, the B CCD reformattor memory 85 is unloaded and vice versa. The enable for the multiplexer 82 is represented by waveform 121.

Accordingly, to promote the progress in the science and useful arts, we claim the following:

1. A time discrete digital reformattor for reformatting analog data from a detector array of a plurality of detectors wherein the time discrete digital reformattor comprises:
   a summing circuit:
   an input circuit having a plurality of inputs with each single input being operatively connected to a single detector of the plurality of detectors;
   a first time discrete digital memory electrically connected to receive outputs from the input circuit; and
   a second time discrete digital memory electrically connected to operate in cooperation with the first time discrete digital memory to provide outputs to the summing circuit.

2. The time discrete reformattor according to claim 1 wherein the input circuit comprises:
   a multiplexer operatively connected between the detectors and the first and second time discrete digital memories.

3. The time discrete digital reformattor according to claim 2 wherein the first and second time discrete digital memories each comprises:
   a time discrete digital memory array;
   a time discrete digital input register operatively connected to the time discrete digital memory array; and
   a time discrete digital output register operatively connected to the time discrete digital memory array.

4. The time discrete digital reformattor according to claim 1 wherein the first time discrete digital memory comprises:
   a first plurality of time discrete digital shift register circuits with the input of each single time discrete digital shift register circuit being operatively connected to a single detector.

5. The time discrete digital reformattor according to claim 4 wherein the second time discrete digital memory comprises:
   a second plurality of time discrete digital shift register circuits with the input of each single time discrete digital shift register circuit of the second plurality of time discrete digital shift register circuits being operatively connected to a single output from a single time discrete digital shift register circuit of the first plurality of time discrete digital shift register circuits.

6. The time discrete digital reformattor according to claim 5 further comprising a time delay and integration circuit including:
   a second plurality of detectors configured as a second array of detectors and combined with said array of detectors wherein in a first coordinate of said array of detectors there is located adjacent to each single detector of said array of detectors a detector of the second array of detectors;
   a third plurality of time discrete digital shift register circuits with the input of each single time discrete digital shift register circuit being operatively connected to a single detector of the second array; and
   a plurality of integration circuits with each single integration circuit having a first input operatively to a single time discrete digital shift register circuit of the first plurality of time discrete digital shift register circuits, a second input operatively connected to a single time discrete digital shift register circuit of the third plurality of time discrete digital shift register circuits and an output operatively connected to an input of a single time discrete digital shift register circuit of the second plurality of time discrete digital shift register circuits.

7. The time discrete digital reformattor according to claim 1 further comprising:
   a first plurality of double pole throw switches with a first pole of each single double pole double throw switch being connected to a single detector, a second pole of said switch of each single double throw double pole switch being operatively connected to the summing circuit, a first contact of each single double throw double pole switch being connected to an input of the first time discrete digital memory, a second contact of each single double throw double pole switch being connected to an input of the second time discrete digital memory, a third contact of each single double throw double pole switch being connected to an output of the second time discrete digital memory and a fourth contact of each single double throw double pole switch being connected an output of the first time discrete digital memory; and each single double throw double pole switch being arrange such that the first pole is electrically connected to the first contact and the second pole is electrically connected to the third contact when the double throw double pole switch is in a first position and the first pole is electrically connected to the second contact and the second pole is electrically connected to the fourth contact when the double throw double pole switch is in a second position.

8. The time discrete digital reformattor according to claim 7 wherein the first time discrete digital memory comprises:

a first plurality of time discrete digital shift register circuits with the input of each single time discrete digital shift register circuit being operatively connected to a first contact of a single double throw double pole switch and the output of each single time discrete digital shift register being operatively connected to a fourth contact of the single double throw double pole switch.

9. The time discrete digital reformattor according to claim 8 wherein the second time discrete digital memory comprises:

a second plurality of time discrete digital shift register circuits with the input of each single time discrete digital shift register circuit of the second plurality of time discrete digital shift register circuits being operatively connected to a secod contact of the single double throw double pole switch and the output being connected to a third contact of the single double throw double pole switch.

10. The time discrete digital reformattor according to claim 9 further comprising a time delay and integration circuit including:

a second plurality of detectors configured as a second array of detectors and combined with said array of detectors wherein a first coordinate of said array of detectors there is located adjacent to each single detector of said array of detectors a detector of the second array of detectors;

a second plurality of double pole double throw switches with a first pole of each single double pole double throw switch of the second plurality of double pole double throw switches being connected to a single detector of the second array, a second pole of each single double throw double pole switch of the second plurality of double pole double throw switches being operatively connected to the summing circuit;

a third plurality of time discrete digital shift register circuits with the input of each single time discrete digital shift register circuit of the third plurality of time discrete digital shift register circuits being operatively connected to a first contact of a single double pole double throw switch of the second plurality of double pole double throw switches and the output of each single time discrete digital shift register being operatively connected to a fourth contact of the single double pole double throw pole switch of the second plurality of double pole double throw switches;

a fourth plurality of time discrete digital shift register circuits with the input of each single time discrete digital shift register circuit of the second plurality of time discrete digital shift register circuits being operatively connected to a second contact of the single double throw double pole switch of the second plurality of double pole double throw switches and the output being connected to a third contact of the single double throw double pole switch; and each single double throw double pole switch of the second plurality of double pole double throw switches being arrange such that the first pole is electrically connected to the first contact and the second pole is electrically connected to the third contact when the double throw double pole switch of the second plurality of double pole double throw switches is in a first position and the first pole is electrically connected to the second contact and the second pole is electrically connected to the fourth contact when the double throw double pole switch of the second plurality of double pole double throw switches is in a second position.

11. A time discrete digital reformattor for reformatting analog data from a detector array of a plurality of detectors with each detector converting radiation to analog signals wherein the time discrete digital reformattor comprises:

an input circuit means having a plurality of inputs with each single input being operatively connected to a single detector of the plurality of detectors for receiving the analog signals;

a first time discrete digital memory means electrically connected to receive outputs from the input circuit for converting the analog signals to time discrete digital signals and for storing the time discrete digital signals therein;

a second time discrete digital memory means for cooperating with the first time discrete digital memory means for arranging analog signals in a video format; and a summing circuit means for summing signals from the first and time discrete memory means.

12. The time discrete digital reformattor according to claim 11 wherein the time input circuit means comprises:

a multiplexer means operatively connected between the detectors and the first and second time discrete digital memories means for multiplexing the analog signals from the detectors to the first and second time discrete digital memory means.

13. The time discrete digital reformattor according to claim 12 wherein the first and second time discrete digital memory means each comprises:

a time discrete digital memory array;

a time discrete digital input register operatively connected to the time discrete digital memory array; and a time discrete digital output register operatively connected to the time discrete digital memory array.

14. The time discrete digital reformattor according to claim 11 wherein the first time discrete digital memory means comprises:
a first plurality of time discrete digital shift register circuits with the input of each single time discrete digital shift register circuit being operatively connected to a single detector.

15. The time discrete digital reformattor according to claim 14 wherein the second time discrete digital memory means comprises:
a second plurality of time discrete digital shift register circuits with the input of each single time discrete digital shift register circuit of the second plurality of time discrete digital shift register circuits being operatively connected to a single output from a single time discrete digital shift register circuit of the first plurality of time discrete digital shift register circuits.

16. The time discrete digital reformattor according to claim 15 further comprising a time delay and integration circuit including:
a second plurality of detectors configured as a second array of detectors and combined with said array of detectors wherein in a first coordinate of said array of detectors there is located adjacent to each single detector of said array of detectors a detector of the second array of detectors; and
time delay and integration means for correlating and combining the adjacent detectors in the first coordinate.

17. The time discrete digital reformattor according to claim 16 wherein the time delay and integration means comprises:
a third plurality of time discrete digital shift register circuits with the input of each single time discrete digital shift register circuit being operatively connected to a single detector of the second array; and
a plurality of summing circuit with each single summing circuit having a first input operatively to a single time discrete digital shift register circuit of the first plurality of time discrete digital shift register circuits, a second input operatively connected to a single time discrete digital shift register circuit of the third plurality of time discrete digital shift register circuits and an output operatively connected to an input of a single time discrete digital shift register circuit of the second plurality of time discrete digital shift register circuits.

18. The time discrete digital reformattor according to claim 11 further comprising:
a first plurality of double pole double throw switches with a first pole of each single double pole double throw switch being connected to a single detector, a second pole of said switch of each single double throw double pole switch being operatively connected to the summing circuit means, a first contact of each single double throw double pole switch being connected to an input of the first time discrete digital memory means, a second contact of each single double throw double pole switch being connected to an input of the second time discrete digital memory means, a third contact of each single double throw double pole switch being connected to an output of the second time discrete digital memory means and a fourth contact of each single double throw double pole switch being connected an output of the first time discrete digital memory means; and
each single double throw double pole switch being arrange such that the first pole is electrically connected to the first contact and the second pole is electrically connected to the third contact when the double throw double pole switch is in a first position and the first pole is electrically connected to the second contact and the second pole is electrically connected to the fourth contact when the double throw double pole switch is in a second position.

19. The time discrete digital reformattor according to claim 18 wherein the first time discrete digital memory means comprises:
a first plurality of time discrete digital shift register circuits with the input of each single time discrete digital shift register circuit being operatively connected to a first contact of a single double throw double pole switch and the output of each single time discrete digital shift register being operatively connected to a fourth contact of the single double throw double pole switch.

20. The time discrete digital reformattor according to claim 19 wherein the second time discrete digital memory means comprises:
a second plurality of time discrete digital shift register circuits with the input of each single time discrete digital shift register circuit of the second plurality of time discrete digital shift register circuits being operatively connected to a second contact of the single double throw double pole switch and the output being connected to a third contact of the single double throw double pole switch.

21. The time discrete digital reformattor according to claim 20 further comprising a time delay and integration circuit including: a second plurality of detectors configured as a second array of detectors and combined with said array of detectors wherein in a first coordinate of said array of detectors there is located adjacent to each single detector of said array of detectors a detector of the second array of detectors; and
time delay and integration means for correlating and combining the analog signals from adjacent detectors in the first coordinate.

22. The time discrete digital reformattor according to claim 21 wherein the time delay and integration means comprises:
a second plurality of double pole double throw switches with a first pole of each single double pole double throw switch of the second plurality of double pole double throw switches being connectd to a single detector of the second array, a second pole of each single double throw double pole switch of the second plurality of double pole double throw switches being operatively connected to the summing circuit;
a third plurality of time discrete digital shift register circuits with the input of each single time discrete digital shift register circuit of the third plurality of time discrete digital shift register circuits being operatively connected to a first contact of a single double pole double throw switch of the second plurality of double pole double throw switches and the output of each single time discrete digital shift register being operatively connected to a fourth contact of the single double pole double throw pole switch of the second plurality of double pole double throw switches;

a fourth plurality of time discrete digital shift register circuits with the input of each single time discrete digital shift register circuit of the second plurality of time discrete digital shift register circuits being operatively connected to a second contact of the single double throw double pole switch of the second plurality of double pole double throw switches and the output being connected to a third contact of the single double throw double pole switch; and each single double throw double pole switch of the second plurality of double pole double throw switches being arrange such that the first pole is electrically connected to the first contact and the second pole is electrically connected to the third contact when the double throw double pole switch of the second plurality of double pole double throw switches is in a first position and the first pole is electrically connected to the second contact and the second pole is electrically connected to the fourth contact when the double throw double pole switch of the second plurality of double pole double throw switches is in a second position.

23. A method of reformatting analog data from a detector array of a plurality of detectors with each detector converting radiation to analog signals comprising the steps of:

receiving the analog signals with an input circuit means having a plurality of inputs with each single input being operatively connected to a single detector of the plurality of detectors;

converting the analog signals to time discrete digital signals with a first time discrete memory means and storing the time discrete digital signals in the first time discrete digital memory means;

cooperating with the first time discrete digital memory means and arranging the time discrete digital signals in a video format with a second time discrete digital memory means; and summing signals from the first and second time discrete memory means with a a summing circuit means.

24. The method according to claim 23 further comprising the steps of:

converting the analog signals from adjacent rows of detectors to a second set of time discrete digital signals;

adjusting the phase relationship between the time discrete signals; and combining the adjusted time discrete digital signal with the time discrete digital signal.

* * * * *